United States Patent [19]

Kurosawa

[11] Patent Number: 4,612,590
[45] Date of Patent: Sep. 16, 1986

[54] TAPE DRIVE DEVICE FOR TELEPHONE ANSWERING DEVICE

[75] Inventor: Tsutomu Kurosawa, Menuma, Japan
[73] Assignee: Asahi Electronics Co., Ltd., Japan
[21] Appl. No.: 741,011
[22] Filed: Jun. 3, 1985

Related U.S. Application Data

[63] Continuation of Ser. No. 386,663, Jun. 9, 1982, abandoned.

[30] Foreign Application Priority Data

Apr. 24, 1982 [JP] Japan .............................. 57-59928[U]

[51] Int. Cl.⁴ ............................................ G11B 5/008
[52] U.S. Cl. .................................... 360/91; 360/96.1; 360/96.2; 242/199
[58] Field of Search ................................ 360/90–96.6; 179/6.01–6.03, 6.07, 6.11; 242/198–200, 208

[56] References Cited

U.S. PATENT DOCUMENTS

| | | | |
|---|---|---|---|
| 4,114,834 | 9/1978 | Haake | 242/200 |
| 4,385,205 | 5/1983 | Jacobson | 179/6.03 |
| 4,563,711 | 1/1986 | Takai | 242/208 X |

Primary Examiner—A. J. Heinz
Attorney, Agent, or Firm—Jordan B. Bierman

[57] ABSTRACT

In a tape drive device for a telephone answering device, an idler is rotated by a motor and displaced selectively according to the directions of rotation of the motor so that the idler is brought into contact with a desired one of the first and second capstan flywheels which are adapted to drive the answering magnetic tape and the message recording magnetic tape, respectively.

2 Claims, 4 Drawing Figures

(A)

(B)

TAPE DRIVE DEVICE FOR TELEPHONE ANSWERING DEVICE

This application is a continuation, of application Ser. No. 386,663, filed June 9, 1982 now abandoned.

BACKGROUND OF THE INVENTION

This invention relates to tape drive devices for telephone answering devices such as so-called "automatic telephone answering devices.

A two-motor type tape drive device for a telephone answering device is well known in that art, in which one motor is provided for driving an answering magnetic tape only and another motor is provided for driving a message recording magnetic tape only. The tape drive device is disadvantageous in that the number of motors and relevant components thereof is relatively large and accordingly the device is bulky and high in manufacturing cost.

A one-motor type tape drive device is also known in the art. The tape drive device needs means for switching a power transmitting mechanism adapted to transmit the rotation of the motor to a capstan flywheel for the answering magnetic tape and to a capstan flywheel for the message recording magnetic tape. For this purpose, the device has switching means such as plungers. Thus, the device is still disadvantageous in that it is intricate in arrangement and is liable to become bulky.

SUMMARY OF THE INVENTION

Accordingly, an object of this invention is to eliminate the above-described drawbacks accompanying a conventional tape drive device for a telephone answering device.

More specifically, an object of this invention is to provide a tape drive device for an telephone answering device, which is small in the number of components, simple in arrangement and small in size.

The foregoing object and other objects as well as the characteristic features of the present invention will become more apparent from the following detailed description and the appended claim when read in conjunction with the accompanying drawings, in which like parts are designated by like reference numerals or characters.

Figure 1:
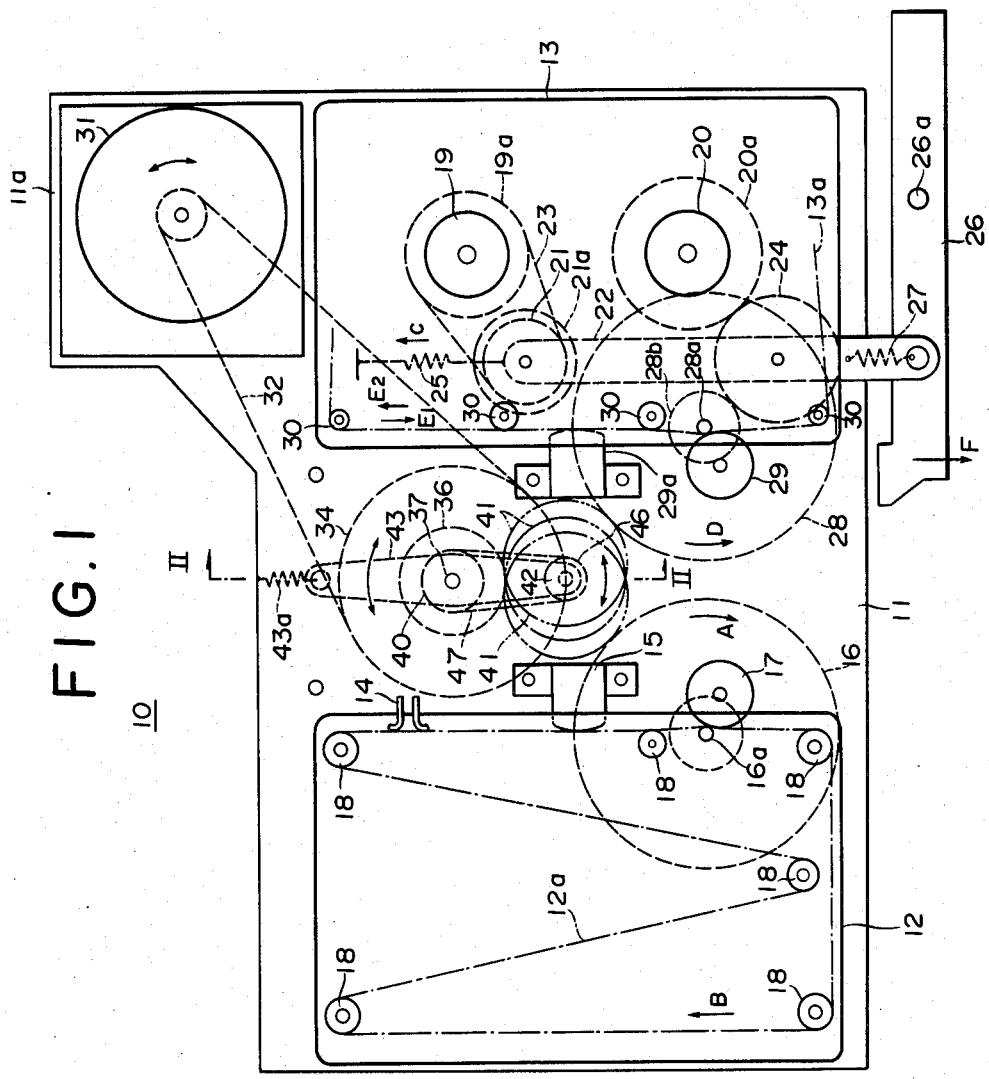
FIG. 1 is a plan view showing one example of a tape drive device for a telephone answering device, according to this invention.
Figure 3:
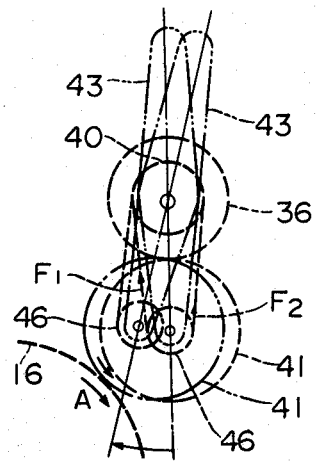
Figure 3:
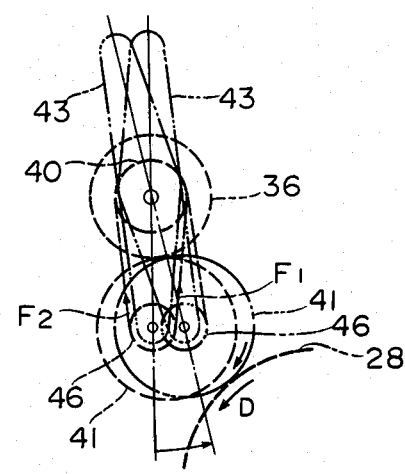

The parts (A) and (B) of FIG. 3 are plan views for a description of the operations of essential components in the device shown in FIG. 1.

DETAILED DESCRIPTION OF THE INVENTION

A tape drive device 10 in a telephone answering device according to this invention has its essential components installed on a base chassis 11 as shown in FIG. 1. An answering tape cassette 12 incorporating an endless-belt-shaped answering magnetic tape 12a is fixedly disposed on the left-handed portion of the base chassis, while a message recording tape cassette 13 incorporating a message recording magnetic tape 13a is held on the right-handed portion of the base chassis.

Data to be answered to a calling party has been recorded in the answering magnetic tape 12a. A head base (not shown) on which a sensor 14, a playback magnetic head 15 and a pinch roller are arranged is disposed in the front opening of the tape cassette 12 in such a manner that it is urged clockwise by a tension spring (not shown), so that the pinch roller is pressed against a capstan 16a.

A flywheel 16 is provided underneath the base chassis 11. As the flywheel 16 is turned in the direction of the arrow A the tape 12 laid over a plurality of guide rollers 18 is run in the direction of the arrow B while being held between the capstan 16a and a pinch roller 17, so that the answering data are reproduced by the playback magnetic head 15. A conductive foil (not shown) is bonded to a portion of the tape 12, so that one turn (or cycle) of the tape 12 is detected by the sensor 14.

The message recording magnetic tape 13a is to record and reproduce a message from a calling party. A supplying reel stand 19 and a winding reel stand 20 are provided at the positions of a supplying reel and a winding reel (not shown) of the tape cassette 13, respectively. A rewinding pulley 21 is arranged adjacent to the supplying reel stand 19. The pulley 21 has a small roller 21a, and is rotatably mounted on one end portion of a slide lever 22. A rubber belt 23 is laid over the rewinding pulley and a pulley 19a integral with the supplying reel stand 19. A winding idler 24, which is rotatably mounted on the slide lever 22, is arranged adjacent to the winding reel stand 20. The idler 24 is pressed against a roller 28b and a winding reel base 20a by a tension coil spring 25, which is connected between the one end portion of the lever 22 and the base chassis 11, so that the lever 22 is maintained urged in the direction of the arrow C. The other end portion of the lever 22 is rotatably coupled through a pin to a portion of an operating lever 26. The operating lever 26 is turnable about a supporting pin 26a. A returning coil spring 27 is connected between a portion of the operating lever 26 and the base chasis, so that the operating lever 26 is urged clockwise at all times. The end of the operating lever is cut to provide a sloped surface 26b there, and the sloped surface 26b is set close to a pin Ib of the head base (not shown) with a suitable gap therebetween.

A capstan flywheel 28 having a capstan 28a and the small-diameter roller 28b is provided underneath the chassis on the side of the tape cassette 13. More specifically, the capstan 28a is so disposed that it is in contact with the inner side of the magnetic tape 13a. A pinch roller 29 and a recording and reproducing magnetic head 29a on a head base (not shown) is provided in a manner as to be in contact with the outer side of the magnetic tape 13a. The pinch roller 29 is pressed against the capstan because the head base is urged counter-clockwise about the center Ia on the chassis. As the flywheel 28 is turned in the direction of the arrow D as described later, the magnetic tape 13a laid over a number of guide rollers 30 is run by rotation of the capstan while being held between the capstan and the pinch roller, and is wound on the winding reel.

A motor 31 is provided at one corner portion of the base chassis 11. The motor 31 is rotated in a forward or reverse direction in response to a control signal. The motor 31 has a motor pulley 31a, the rotation of which is transmitted through a rubber belt 32 to a large diameter pulley 34 which is provided on a sub-chassis 33 (FIG. 2) and between the tape cassettes 12 and 13.

Figure 2:
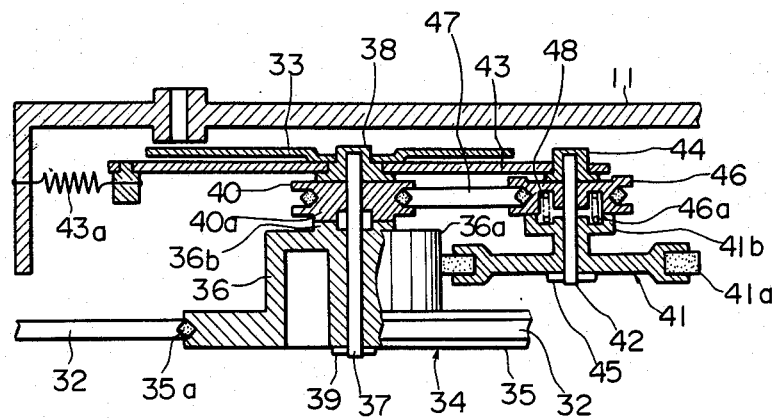
FIG. 2 is a sectional view taken along line II—II in FIG. 1.

The large diameter pulley 34, as shown in FIG. 2, comprises a pulley part 35 having a circumferential groove 35a, and a roller part 36 which is integral with the pulley part 35 and is smaller in diameter than the latter 35. The outer wall of the roller part 35 is knurled as indicated at 36a. A supporting shaft 37 is inserted into the axial hole of the large diameter pulley 34. One end portion of the supporting shaft 37 is fixedly secured to a collar 38 which is staked to the sub-chassis 33. An "E" ring is fitted on the other end portion of the supporting shaft 37, so that the pulley 34 may not come off the supporting shaft.

A small diameter pulley 40 is interposed between the large diameter pulley 34 and the collar 38. The small diameter pulley 40 has a tooth part 40a at one end face, which is engaged with a tooth part 36b which is formed at on end face of the roller part 36 of the large diameter pulley 34. Accordingly, as the large diameter pulley 34 turns, the small diameter pulley 40 is turned in the same direction as one unit.

The supporting shaft 37 is located intermediate between the two capstans 16a and 28a as is apparent from FIG. 1, and an idler 41 is provided substantially at the center of the supporting shaft and the capstans 16a and 28a. The idler 41 is turnable around a supporting shaft 42 and has a circumferential groove in which a rubber tire 41a is fitted. The outer wall of the rubber tire 41a is in contact with the outer wall of the roller part 36 of the large diameter pulley 34. One end portion of the supporting shaft 42 is fixedly secured to a collar 44 which is rotatably connected to one end portion of a coupling lever 43. An "E" ring 45 is fitted on the other end portion of the supporting shaft 42, so that the idler 41 may not come off the shaft 42. The coupling lever 43 is rotatably coupled to the collar 38 on the side of the large diameter pulley 34.

The idler 41 has a cylindrical part 41b. A small diameter pulley 46 is interposed between the cylindrical part 41b and the collar 44. A rubber belt is laid over the small diameter pulleys 46 and 40. The small diameter pulley 46 has an annular groove 46a in its one end face. A coil spring 48 is compressed between the groove 46a and the cylindrical part 41b, so that the pulley 46 is coupled through rotational friction to the idler 41. This is to increase the difference in tension between the slackening side and the pulley side of the rubber belt 47, thereby to increase the rotational moment of the coupling lever.

Now, the operation of the tape drive device thus constructed will be described.

In response to a calling signal, the motor pulley 31a starts to rotate clock-wise in FIG. 1 (in the forward direction), and the large diameter pulley 34 and the small diameter pulley 40 are turned clockwise. As the pulley 34 is turned clockwise, the idle 41, being in contact with the roller part 36, is turned counterclockwise through friction. In this operation, the toruque is positively transmitted because the rubber tire 41a is in contact with the knurled wall 36a of the roller part 36. On the other hand, as the small diameter pulley 40 is turned clockwise, the rotation of the pulley 40 is transmitted through the rubber belt 47 to the small diameter pulley 46, so that the latter 46 is turned clockwise aroudn the supporting shaft 46. In this operation, the idler 41 is pulled towards the large diameter pulley 34 by the tension of the rubber belt 47, and therefore the idler 41 is maintained pressed against the roller part 36 even if the idler 41 plays somewhat.

Let us consider the belt 47. The belt 47 turns counterclockwise in FIG. 1, and therefire the left-handed side of the belt 47 is a slackening side, while the right-handed side is a pulling side. Therefore, a pulling-side tension $F_1$ is applied to the left-handed side of the small diameter pulley 46, while a slackening-side tension $F_2(F_2>F_1)$ is, applied to the right-handed side of the pulley 46 as shown in the part (A) of FIG. 3. As a result, clockwise rotational moment due to the difference between the two tensions $F_1$ and $F_2$, namely, an effective tension is applied to the coupling lever 43. Accordingly, the coupling lever is turned clockwise, so that the idle 41 is displaced to the left until it contacts the circumferential wall of the capstan flywheel 16. As a result, the flywheel 16 is is turned in the direction of the arrow A in FIG. 1, and the magnetic tape 12a is run in the direction of the arrow B in FIG. 1, so that the answering data is reproduced.

When the sensor 14 detects one turn of the magnetic tape 12a, it outputs a detection signal, in response to which the clockwise rotation of the motor 31 is stopped, and the motor 31 is turned counterclockwise. When the rotation is stopped, the aforementioned effective tension becomes zero.

As the motor pulley 31a is turned counterclockwise (in the reverse direction), the small and large pulleys are also turned counterclockwise, and the idler 41 is turned clockwise. On the other hand, the small diameter pulley 46 is turned counterclockwise, and the belt 47 is turned counterclockwise. In this operation, the left-handed side of the belt 47 is a slackening side, while the right-handed side is a pulling side. Therefore, the slackening-side tension $F_2$ is applied to the left-handed side of the pulley 46, while the pulling-side tension $F_1$ ($F_1>F_2$) to the right-handed side. Accordingly, the counterclockwise rotational moment due to the effective tension acts on the coupling lever 43, as a result of which the coupling lever 43 is turned counterclockwise from its neutal position, while the idler 41 is displaced to the right until it presses the circumferential wall of the capstan flywheel 28. Accordingly, the flywheel 28 is turned in the direction of the arrow D in FIG. 1. The rotation of the flywheel 28 is transmitted through the winding idler 24 to the winding reel stand 20. Therefore, the latter 20 is turned counterclockwise, so as to run the magnetic tape 13a in the direction of the arrow $E_1$ in FIG. 1, whereby the calling party's message is recorded in the magnetic tape 13a.

Now, the operation of rewinding the magnetic tape 13a will be described.

In this operation, similarly as in the above-described message recording operation, the motor 31 is turned counter clockwise and the capstant flywheel 28 is turned in the direction of the arrow D in FIG. 1. Under this condition, the operating lever 26 is turned in the direction of the arrow F in FIG. 1, to cause the sloped surface 26b to push the pin Ib of the head base (not shown) to the left, as a result of which the head base is turned counterclockwise about the center of rotation Ia on the chassis 11, so that the head pinch roller is moved away from the tape. The coupling lever 22 is slid in a direction opposite to the direction of the arrow C in FIG. 1 against the elastic force of the tension coil spring 25. Therefore, the winding idler 24 is moved away from the small diameter roller part 28b of the capstan flywheel 28 and the roller part 20a of the winding reel stand 20, while the roller part of the rewinding pulley 21 is pressed against both the flywheel 28 and the roller part 19a of the supplying reel stand 19. Accordingly, the rotation of the flywheel 28 is transmitted to the supplying reel stand 19. As a result, the supplying reel stand 19 is turned clockwise, so that the magnetic tape 13a is run in the direction of the arrow $E_2$ in FIG. 1. Thus, the rewinding operation is carried out.

As is apparent from the above description, the tape drive device according to the invention is so designed that the idler 41 for driving the two capstan flywheels 16 and 28 is displaced according to the directions of rotation of the single motor 31. Therefore, it is unnecessary to provide an intricate switching mechanism. Thus, the device of the invention is advantageous in that it is simple in construction, low in manufacturing cost, small in weight and small in size.

What is claimed is:

1. A tape drive device for driving a multi-tape device comprising:
   a base;
   a first capstan flywheel rotatably mounted on said base and coupled to a capstan shaft for driving a first magnetic tape;
   a second capstan flywheel also rotatably mounted on said base and coupled to a capstan shaft for driving a second, different magnetic tape in a direction of rotation opposite to that of said first capstan flywheel;
   a single reversible motor means mounted on said base;
   a power transmitting mechanism disposed substantially between said first and second flywheels and including a pivotally disposed idler pulley, interconnected with said motor means, which is displaced against said first flywheel and then, upon reversing the direction of rotation of said motor means, against said second flywheel to alternatively drive either said first tape or said second tape.

2. The tape drive device according to claim 1, wherein said power transmitting mechanism further comprises:
   a lever pivotally mounted around a fixed axis for rotatably holding said idler pulley at a free end thereof;
   a first pulley and first roller each rotatably mounted coaxially on the fixed axis and driven by said motor means;
   a second pulley and second roller each rotatably mounted coaxially on the free end of said lever; and
   a friction belt laid over said first and second pulleys for transmitting driving rotation of said motor means to said second pulley, said first and second rollers being in frictional engagement with respect to each other with said second roller inturn engaging one of the flywheels to direct power from the motor means to the flywheels.

* * * * *